US012689520B2

(12) United States Patent
Johns et al.

(10) Patent No.: US 12,689,520 B2
(45) Date of Patent: Jul. 21, 2026

(54) MULTI-PART TRANSACTION INTEGRITY PROTECTION AND ENCRYPTION

(71) Applicant: INTERNATIONAL BUSINESS MACHINES CORPORATION, Armonk, NY (US)

(72) Inventors: Charles R. Johns, Austin, TX (US); Guerney D.H. Hunt, Yorktown Heights, NY (US); Florian Auernhammer, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 18/343,280

(22) Filed: Jun. 28, 2023

(65) Prior Publication Data

US 2025/0007722 A1 Jan. 2, 2025

(51) Int. Cl.
*H04L 9/32* (2006.01)
*G06F 13/42* (2006.01)
(52) U.S. Cl.
CPC ........ *H04L 9/3242* (2013.01); *G06F 13/4282* (2013.01)
(58) Field of Classification Search
None
See application file for complete search history.

(56) References Cited

U.S. PATENT DOCUMENTS

| 8,612,627 | B1 | 12/2013 | Brandwine |
| 10,826,940 | B2 | 11/2020 | Narayanaswamy et al. |

| 2016/0255065 | A1* | 9/2016 | Oshida | H04L 69/324 |
| | | | | 726/3 |
| 2019/0139045 | A1 | 5/2019 | Dooley et al. | |
| 2019/0220721 | A1* | 7/2019 | Chhabra | G06K 19/0724 |
| 2019/0306134 | A1* | 10/2019 | Shanbhogue | H04L 63/123 |
| 2020/0328879 | A1* | 10/2020 | Makaram | H04L 1/1812 |
| 2022/0416996 | A1* | 12/2022 | Cunningham | H04L 9/0643 |
| 2023/0002359 | A1 | 1/2023 | Edmunds et al. | |
| 2023/0020359 | A1* | 1/2023 | Paliwal | G06F 21/602 |
| 2023/0037746 | A1 | 2/2023 | Buendgen et al. | |

FOREIGN PATENT DOCUMENTS

| CN | 121264005 A | 1/2026 |
| WO | 2025/003778 A1 | 1/2025 |

OTHER PUBLICATIONS

International Search Report and Written Opinion, PCT/IB2024/053526, mailed Jul. 4, 2024, 10 pages.

(Continued)

*Primary Examiner* — Philip J Chea
*Assistant Examiner* — James Ross Hollister
(74) *Attorney, Agent, or Firm* — Onyx IP Group

(57) ABSTRACT

Multi-part transaction integrity protection and encryption is disclosed, including generating, by a first device, a first message authentication code (MAC) for authenticating a plurality of packets of a transaction, the plurality of packets including at least a first packet received from a second device over a data link and a second packet generated by the first device in response to receiving the first packet, wherein the first MAC is generated using data included in the plurality of packets; and sending, by the first device to the second device, the second packet and the first MAC over the data link.

25 Claims, 12 Drawing Sheets

(56)     References Cited

OTHER PUBLICATIONS

Li et al., Energy-efficient and high-accuracy secure data aggregation in wireless sensor networks, Elsevier , Computer Communications 34(4):591-597, ScienceDirect, doi:10.1016/j.comcom.2010.02.026, Apr. 2011, Available Online: Mar. 1, 2010, 7 pages.

Othman et al., Secure Data Aggregation with MAC Authentication in Wireless Sensor Networks, 2013 12th IEEE International Conference on Trust, Security and Privacy in Computing and Communications, IEEE Computer Society, DOI: 10.1109/TrustCom.2013.252, Date Added to IEEE Xplore: Dec. 12, 2013, Downloaded Feb. 20, 2023, 8 pages.

Yang et al., Contactless Credit Cards Payment Fraud Protection by Ambient Authentication, Sensors 2022, 22, 1989, MDPI, https://doi.org/10.3390/s22051989, Published Mar. 3, 2022, 22 pages.

* cited by examiner

100

300

600

MULTI-PART TRANSACTION INTEGRITY PROTECTION AND ENCRYPTION

BACKGROUND

Field of the Disclosure

The field of the disclosure is integrity and data encryption, or, more specifically, methods, apparatus, and products for multi-part transaction integrity protection and encryption.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, microcode, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

There are many methods for integrity and data encryption (IDE) of data transferred from one party to another party. These methods are commonly deployed in buses, networks, and other types of links. A transaction is a sequence of requests and responses between two parties on a bus, network, or other type of link. When a transaction is split into multiple parts or phases, conventional encryption and authentication techniques require significant overhead and do not typically work for out-of-order transactions.

Conventional IDE methods typically consist of a packet of data transmitted from a source to a destination. As an example, the following description will employ an Advanced Encryption Standard (AES) with Galois/Counter Mode (AES-GCM) encryption algorithm. The AES specifies a cryptographic algorithm that can be used to protect electronic data. The AES algorithm is a symmetric block cipher that can encrypt (encipher) and decrypt (decipher) information using a shared initialization vector (IV) (i.e., a nonce) and encryption key. Encryption converts plaintext data into an unintelligible form referred to as ciphertext; and decrypting the ciphertext converts the data back into its original form which is referred to as plaintext. AES-GCM provides both authenticated encryption (confidentiality and authentication) and the ability to check the integrity and authentication using a message authentication code (MAC) that is calculated using the plaintext data and the authentication data.

For transmission, the data packet may be first split into plaintext and authentication data. The data packet may then be encrypted using AES-GCM encryption. The resulting ciphertext and authentication data are then transmitted to the destination along with the MAC. The receiver (destination) performs the same encryption method for decryption using the ciphertext received as the plaintext input. The resulting ciphertext is the decrypted data. Finally, the MAC calculated by the receiver is then compared with the MAC received from the source to validate the integrity of the data received. A device monitoring the link may see the authentication data but may not change the authentication data without the change being detected by the MAC check. The plaintext blocks are both encrypted and integrity protected, thus a device monitoring the link can neither see the information in the clear nor change the information without the change being detected.

For a request and response between two parties, conventional methods require the requestor to encrypt the data, calculate a MAC, and send the ciphertext to the destination. The responder receiving the request decrypts the data, calculates a MAC, and compares the MAC to the MAC received from the requestor for validating the integrity of the received data. The responder then generates a response, encrypts the data, calculates a MAC, and sends the ciphertext to the requestor. The requestor receiving the response decrypts the data, calculates a MAC, and compares the MAC to the MAC received from the responder for validating the integrity of the received data. In many cases, the conventional methods are sufficient for protecting the confidentiality (encryption) and integrity (MAC check) for a transaction. However, as is apparent, the transmission of a MAC with each message contributes to a significant amount of traffic on the data link.

When performing transactions across a bus like Compute Express Link (CXL), the transactions are split into multiple phases. In CXL, for example, the CXL.cache protocol allows devices to coherently access and cache host CPU memory with a low latency request/response interface. CXL defines a host-to-device (H2D) channel for messages originating from the host to the target device and a device-to-host (D2H) channel for messages originating from the device to the host. A transaction in this protocol may include multiple phases of D2H request messages, H2D response messages, D2H data headers, and D2H data. Also, in CXL, the CXL.mem protocol allows host CPU to coherently access device memory with load/store commands for both volatile and persistent non-volatile storage. CXL.mem defines a master-to-subordinate (M2S) channel for messages originating from the host to the target device and a subordinate-to-master (S2M) channel for messages originating from the device to the host. A transaction in this protocol may include multiple phases of M2S request messages, M2S request with data messages, S2M response messages, S2M data headers, and S2M data.

To aid illustration, consider an example of a CXL.mem read transaction where the host (master) sends a read request in the form of a M2S request packet. The target (subordinate) receives the request and responds with an S2M response followed by the requested data. Typically, a MAC would need to be sent with the M2S request, and a second MAC tag would be sent with the S2M response and the data packets. Since very few (~100 bits) are transmitted for a M2S request, the transmission of the MAC tag (96-bits) is almost 100% overhead. In another example, a CXL.cache write transaction includes a D2H request followed by a H2D response, followed by a D2H data header and D2H data, followed by a H2D response. Typically, there would need to be a MAC transferred for the D2H request, a second MAC transmitted for the first H2D response, a third MAC transmitted with the D2H data header and D2H data phase, and a fourth MAC with the final H2D response. It is apparent that the conventional method of transmitting a MAC in only a single direction for data integrity imposes significant overhead when applied to multi-part transaction protocols such as CXL.

Further, the IV must be known to both parties to encrypt and decrypt data. The IV can be transmitted with each message, but to reduce bandwidth consumption the IV can be shared once between the parties and the incremented per message. Consequently, to enable integrity checking using a MAC, a unique IV would need to be sent with each request or the request and responses would need to be put back in order by the receiver. In the case of CXL and other bus protocols, requests and responses may be reordered. Consequently, to enable integrity checking using a MAC, a unique IV would need to be sent with each request. Sending an IV with each phase, in the case of multi-part transaction protocols that support reordering, significantly increases the overhead.

Further, with a straightforward application of AES-GCM or other counter mode algorithms, the prevention of replay attacks requires the recipient of a MAC to track which IVs have already been used and fail the transaction if the received IV has previously been used. This requires substantial tracking logic within the receiver.

SUMMARY

Methods, apparatuses, and products for multi-part transaction integrity protection and encryption according to various embodiments are disclosed. As used herein, a transaction refers to a sequence of messages that is initiated with a request message that includes some command (e.g., read, write). Each message that is transmitted from one party to another is referred to as a phase of the transaction. Due to reordering by intermediaries on the link (e.g., switches), transactions, including phases within the transaction, can be received out-of-order. In accordance with embodiments, the creation of the message authentication code (MAC) tag is amortized over multiple phases of a transaction to conserve the bandwidth of the link, irrespective of which party sends a particular phase. In other words, a MAC tag is generated based on data included in one or more prior transaction messages along with data in a current transaction message to which the MAC tag is appended. A link endpoint (requestor or responder) saves a state that includes data from messages that are transmitted and received in the transaction, and uses that data to generate MAC tags to send to the other party as well as to check MAC tags that are received An embodiment is directed to a method for multi-part transaction integrity protection and encryption. The method includes generating, by a first device, a first message authentication code (MAC) for authenticating a plurality of packets of a transaction. The plurality of packets include at least a first packet received from a second device over a data link and a second packet generated by the first device in response to receiving the first packet. The first MAC is generated using data included in the plurality of packets. The first device can be the requestor or the responder of the transaction. The first device can be a host processor where the second device is a coupled device, or the first device can be a device and the second device is the host processor. The data link can be a bus such as a Compute Express Link (CXL) protocol bus. The plurality of packets can include request packets, response, packets, data headers, and data corresponding to a multi-part transaction. The method also includes sending, by the first device to the second device, the second packet and the first MAC over the data link. Thus, both parties contribute data that is used as an input to the generation of the MAC, which allows one MAC to be used to authenticate all of the preceding packets of the transaction.

In some variations, the method also includes receiving, by the first device from the second device, one or more additional packets of the transaction and a second MAC for authenticating the plurality of packets of the transaction including the one or more additional packets. The method also includes decrypting, by the first device, the one or more additional packets. The method also includes generating, by the first device, a third MAC for authenticating the plurality of packets of the transaction, including the one or more additional packets, using data included in the plurality of packets. The method further includes authenticating, by the first device, the plurality of packets including the one or more additional packets based on a comparison of the second MAC and the third MAC.

In some variations, the method also includes generating, by the first device, an initialization vector (IV) based on a combination of a pre-shared IV base and a tag included in the first packet. The IV is used to encrypt and decrypt data. Thus, the potential reordering of packets across transactions is addressed by generating an IV that is uniquely associated with the transaction based on tag information in the packet that is already used for identification of the messages of a transaction. This obviates the need to transmit the entire IV with each packet in the face of potential reordering, which conserves data link bandwidth.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
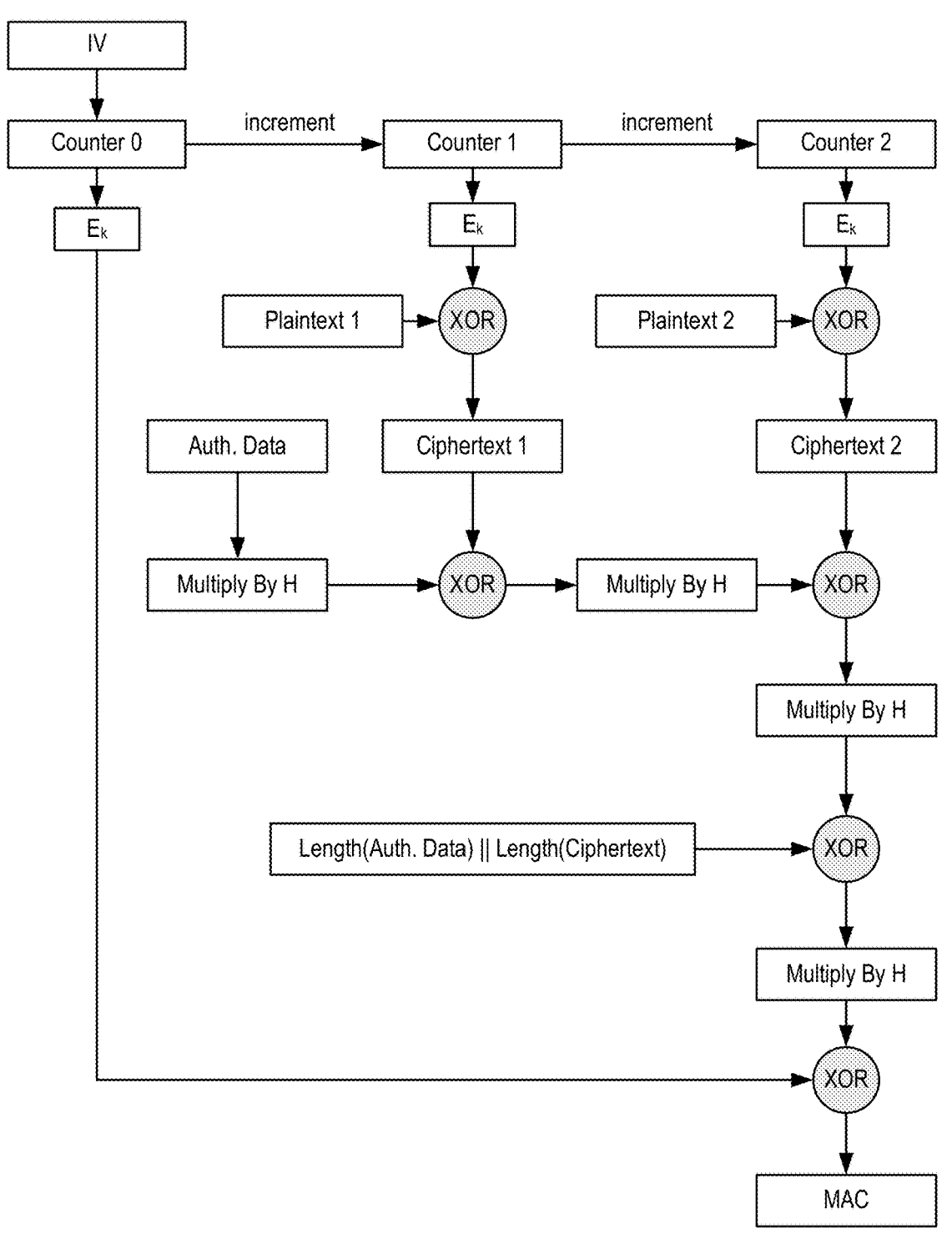
FIG. 1 a flow diagram of an example Advanced Encryption Standard (AES) with Galois/Counter Mode (AES-GCM) encryption algorithm suitable for multi-part transaction integrity protection and encryption in accordance with embodiments of the present disclosure.

Exemplary apparatus and systems for multi-part transaction integrity protection and encryption in accordance with the present disclosure are described with reference to the accompanying drawings, beginning with FIG. 1. FIG. 1 sets forth a flow diagram of an example AES-GCM algorithm 100 for generating a message authentication code (MAC) in accordance with some embodiments of the present disclosure. AES-GCM provides both authenticated encryption (confidentiality and authentication) and the ability to check the integrity and authentication of additional authenticated data that is sent in the clear (i.e., without encryption). There are four inputs to AES-GCM encryption: the key (e.g., an AES key); the initialization vector (IV) (also referred to as a "nonce"); the plaintext (e.g., padded to 128 bits 128 bits); and authentication data (e.g., padded to 128 bits). The authentication data is passed through in the clear, in that it is output from the AES-GCM encryption in the same format and length that it was input to the AES-GCM encryption. The other outputs of the AES-GCM encryption include the cipher text, which is the same length as the plaintext, and a message authentication code (MAC) (e.g., 106 bits) that can be used to authenticate the message. An example AES-GCM algorithm 100 is shown in FIG. 1, where it assumes AES 256 where a 256-bit encryption key (Ex) is used and the IV is a 128-bit nonce (number used only once). The plaintext blocks are the data to be encrypted and the ciphertext blocks are the encrypted data. The multiply by H blocks are the Galois multiple where H is the encryption of '0' using Ex. The authentication data block is the data that is not encrypted but is part of the transmitted data. In accordance with the present disclosure, as will be explained below, one derived counter (i.e., the IV) can be used by both parties. It will be recognized that the Galois multiplier can be performed without requiring all the authentication data at the start of the transaction.

Figure 2:
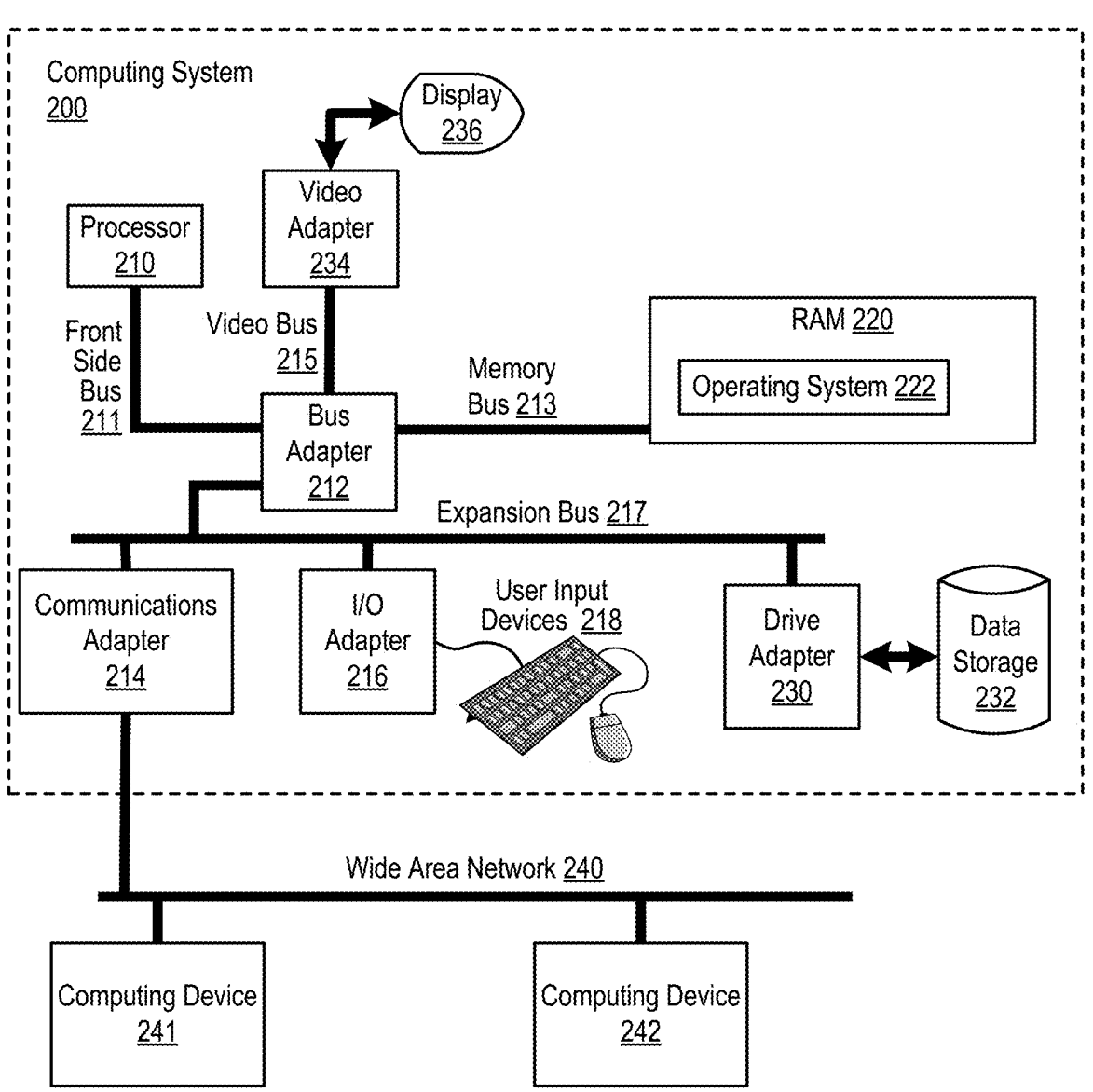
FIG. 2 is a block diagram of an example computing system configured for multi-part transaction integrity protection and encryption in accordance with embodiments of the present disclosure.

FIG. 2 sets forth a block diagram of automated computing machinery comprising an exemplary computing system 200 configured for multi-part transaction integrity protection and encryption according to embodiments of the present disclosure. The computing system 200 of FIG. 2 includes at least one computer processor 210 or 'CPU' as well as random access memory ('RAM') 220 which is connected through a high-speed memory bus 213 and bus adapter 212 to processor 210 and to other components of the computing system 200.

Stored in RAM 220 is an operating system 222. Operating systems useful in computers configured for multi-part transaction integrity protection and encryption according to embodiments of the present disclosure include z/OS™, UNIX™, Linux™, Microsoft Windows™, AIX™, and others as will occur to those of skill in the art. The operating system 222 in the example of FIG. 2 is shown in RAM 220, but many components of such software typically are stored in non-volatile memory also, such as, for example, on data storage 232, such as a disk drive.

The computing system 200 of FIG. 2 includes disk drive adapter 230 coupled through expansion bus 217 and bus adapter 212 to processor 210 and other components of the computing system 200. Disk drive adapter 230 connects non-volatile data storage to the computing system 200 in the form of data storage 232. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 200 of FIG. 2 includes one or more input/output ('I/O') adapters 216. I/O adapters implement user-oriented input/output through, for example, software drivers and computer hardware for controlling output to display devices such as computer display screens, as well as user input from user input devices 218 such as keyboards and mice. The example computing system 200 of FIG. 2 includes a video adapter 234, which is an example of an I/O adapter specially designed for graphic output to a display device 236 such as a display screen or computer monitor. Video adapter 234 is connected to processor 210 through a high speed video bus 215, bus adapter 212, and the front side bus 211, which is also a high speed bus.

The exemplary computing system 200 of FIG. 2 includes a communications adapter 214 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 902.3) adapters for wired data communications, and 902.11 adapters for wireless data communications. The communications adapter 214 of FIG. 2 is communicatively coupled to a wide area network 240 that also includes other computing devices, such as computing devices 241 and 242 as shown in FIG. 2. In accordance with embodiments of the present disclosure, multi-part transaction integrity protection and encryption can be applied over a link such as the memory bus 213, video bus 215, expansion bus 217, and wide area network 240, where any component connected to such a link may carry out the techniques for multi-part transaction integrity protection and encryption described below.

Figure 3:
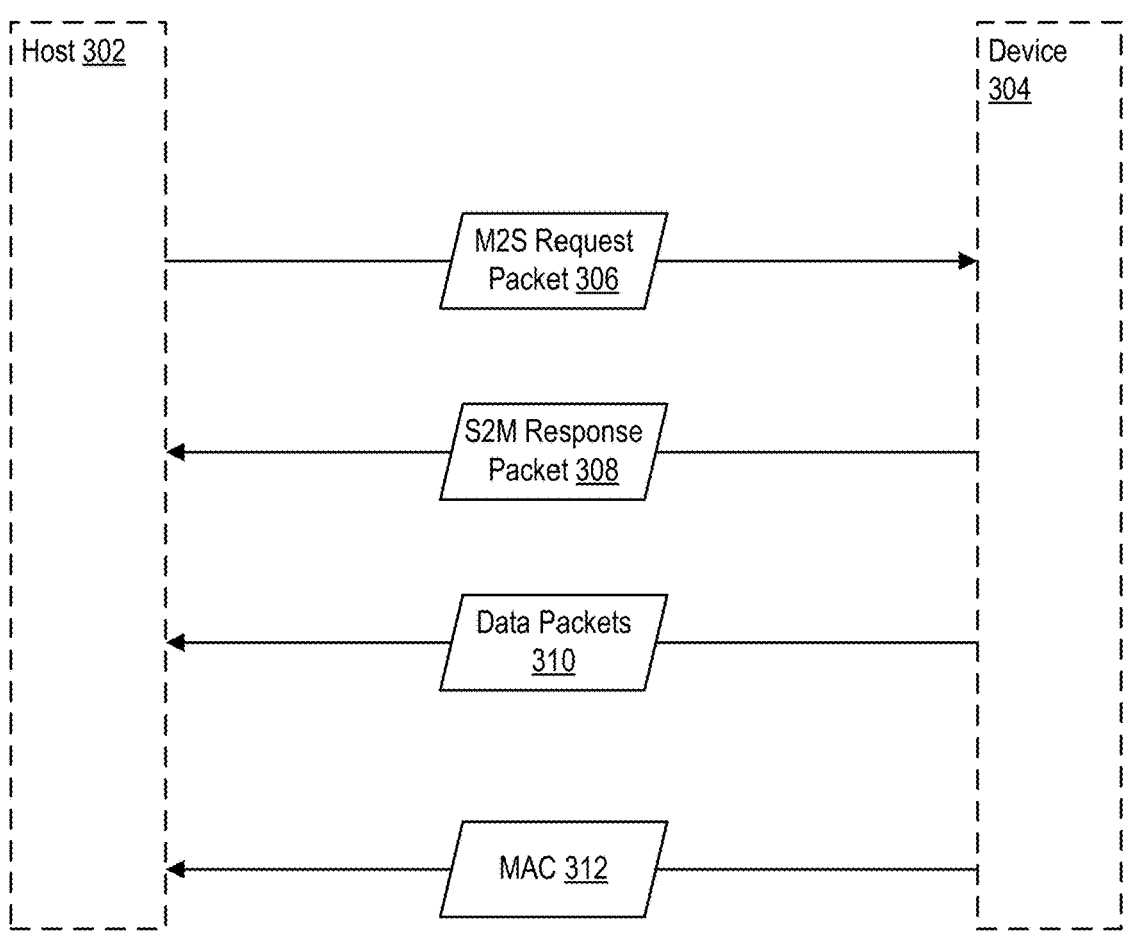
FIG. 3 is a diagram of an example transaction for multi-part transaction integrity protection and encryption in accordance with embodiments of the present disclosure.

For further explanation, FIG. 3 sets forth a diagram illustrating an example transaction 300 for multi-part transaction integrity protection and encryption according to embodiments of the present disclosure. The example of FIG. 3 includes a CXL.mem master to subordinate (M2S) read transaction. Here, the host 302 (e.g., a host CPU) is the requestor and a device 304 is the responder. In the first part, or 'phase' as used herein, of the transaction, the host 302 generates plaintext for a request and encrypts the plaintext to ciphertext. The host 302 then sends an M2S request packet 306 to the device that includes the ciphertext and authentication data. In contrast to a conventional method, the host 302 does not send a MAC for the M2S request packet 306. The host 302 saves a state that includes information such as the authentication data that was sent in the M2S request packet 306 or other information useful to carry out MAC generation and further decryption of phases received from the device. In some cases, the saved state need not include all the information that is transmitted and/or received if the information can be represented as the partial state of the MAC generation or previous MACs themselves.

Figure 4:
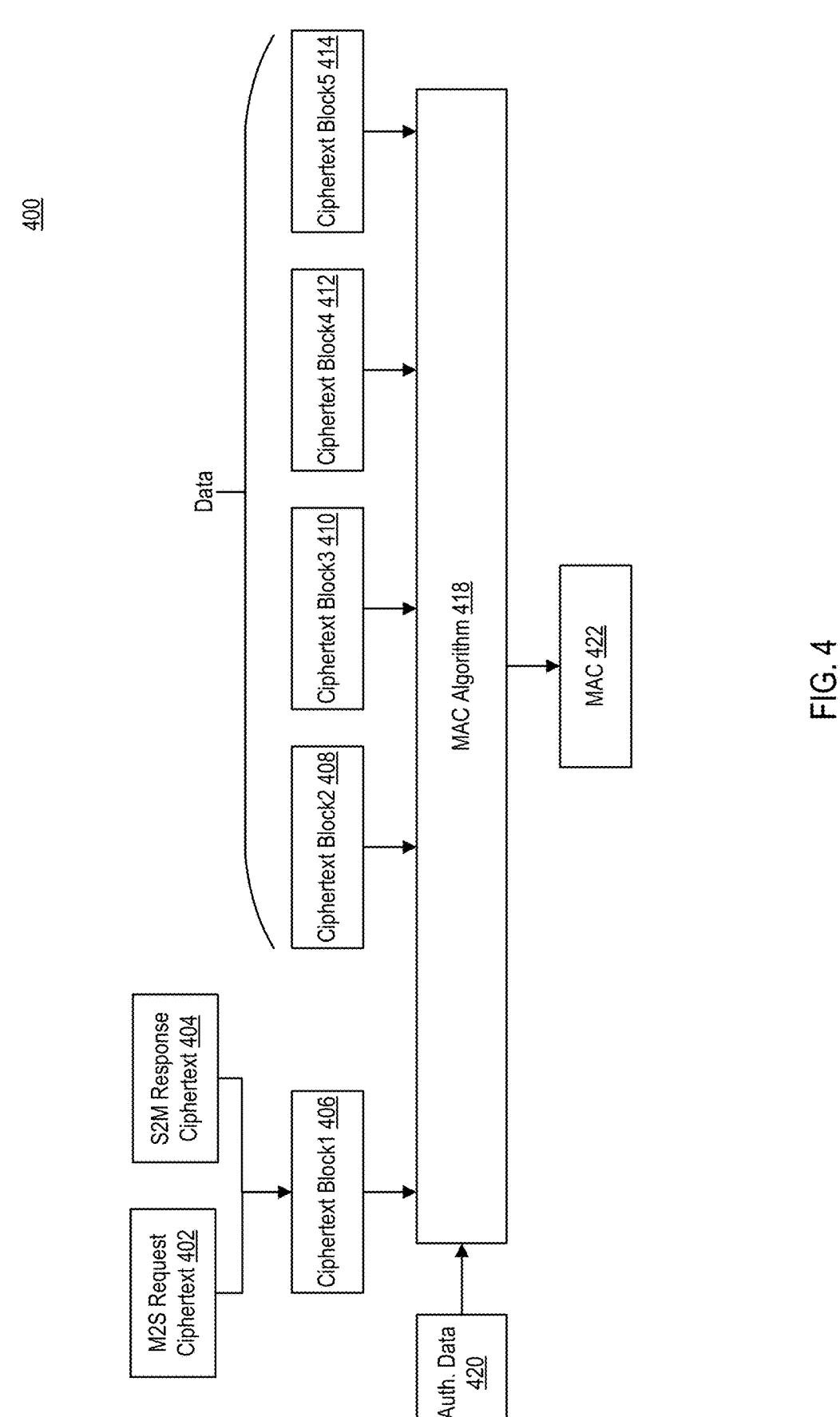
FIG. 4 is a diagram of an example of MAC generation in multi-part transaction integrity protection and encryption in accordance with embodiments of the present disclosure.

The device 304 generates plaintext in response to the request and encrypts the plaintext for an S2M response packet 308. The S2M response packet 308 includes the ciphertext and authentication data generated by the device 304. As the request is for data, the device 304 also prepares plaintext for data packets 310 containing the requested data and encrypts the plaintext. Thus, the S2M response packet 308 may be a data header or data response packet. For authentication data, the device 304 uses authentication data from the M2S request packet 306 and authentication data from the S2M response packet 308 and data packets 310 as combined authentication data for MAC generation. The device 304 generates a MAC 312 for the M2S request packet 306, the S2M response packet 308, and the data packets 310 using the combined authentication data and plaintext from both the M2S request, S2M response, and data block packets, as shown in FIG. 4 described below. MAC generation may be carried out using AES-GCM algorithm shown in FIG. 1 with an IV that is described below. The device 304 sends the S2M response packet 308 (e.g., as phase 2 of the transaction), data packets 310 (e.g., as phase 3 of the transaction), and the MAC 312 (e.g., as phase 4 of the transaction), where the MAC 312 provides an integrity check for the M2S request packet 306, the S2M response packet 308, and the data packets 310.

When the host 302 receives the S2M response packet 308 and data packets 310, the host 302 decrypts the ciphertext in the S2M response packets 308 and data packets 310 using the ciphertext as plaintext in the algorithm of FIG. 1. The host 302 also generates a MAC using the same inputs that were purportedly used to generate the received MAC. The integrity check is performed by comparing this MAC to the MAC 312 received from the device 304. If the MACs match, then the integrity of the full transaction (e.g., phase 1, phase 2, phase 3, and phase 4) is valid. If the MACs do not match, then then part of the transaction received has been modified from what was originally transmitted. While FIG. 3 only shows the requestor receiving a MAC to validate the transaction, it should be understood by one skilled in the art that other mitigations, such as a MAC sent to the responder, might be necessary for mitigating all security threats.

For further explanation, FIG. 4 illustrates an example MAC generation 400 for multi-part transaction integrity protection and encryption in accordance with some embodiments of the present disclosure. FIG. 4 shows an example MAC generation by the responder for the transaction 300 of FIG. 3, in which the input to a MAC generation algorithm (e.g., the algorithm of FIG. 1) includes ciphertext that was included in packets that were sent by the host and packets sent by the device during the transaction. As shown in FIG. 4, ciphertext 402 from the M2S request packet 306 and ciphertext 404 included in the S2M response packet 308 are combined into ciphertext block1 406 (with padding to 128-bits). Encrypted data from the four 128-bit data blocks that are sent by the device are used as ciphertext block2 408, ciphertext block3 410, ciphertext block4 412, and ciphertext block5 414. These five 128-bit ciphertext blocks are input to the MAC generation algorithm 418, along with authentication data 420, to generate a MAC 422 that can be used to authenticate all of the packets in the transaction. The authentication data 420 is created from unencrypted information from the M2S request packet 306 and the S2M response packet 308, as well as any unencrypted from the data packets, padded to 128-bits.

Each M2S request and S2M response, and any packet in CXL, includes a transaction tag. The transaction tag indicates the transaction with which the packet is associated. In some examples, the transaction tag forms part of the authentication data used for MAC generation. Other elements of the authentication data may include a valid bit, a traffic control tag, and all or part of an address specified in the packet. These elements, and thus the authentication data, are transmitted in the clear.

Figure 5:
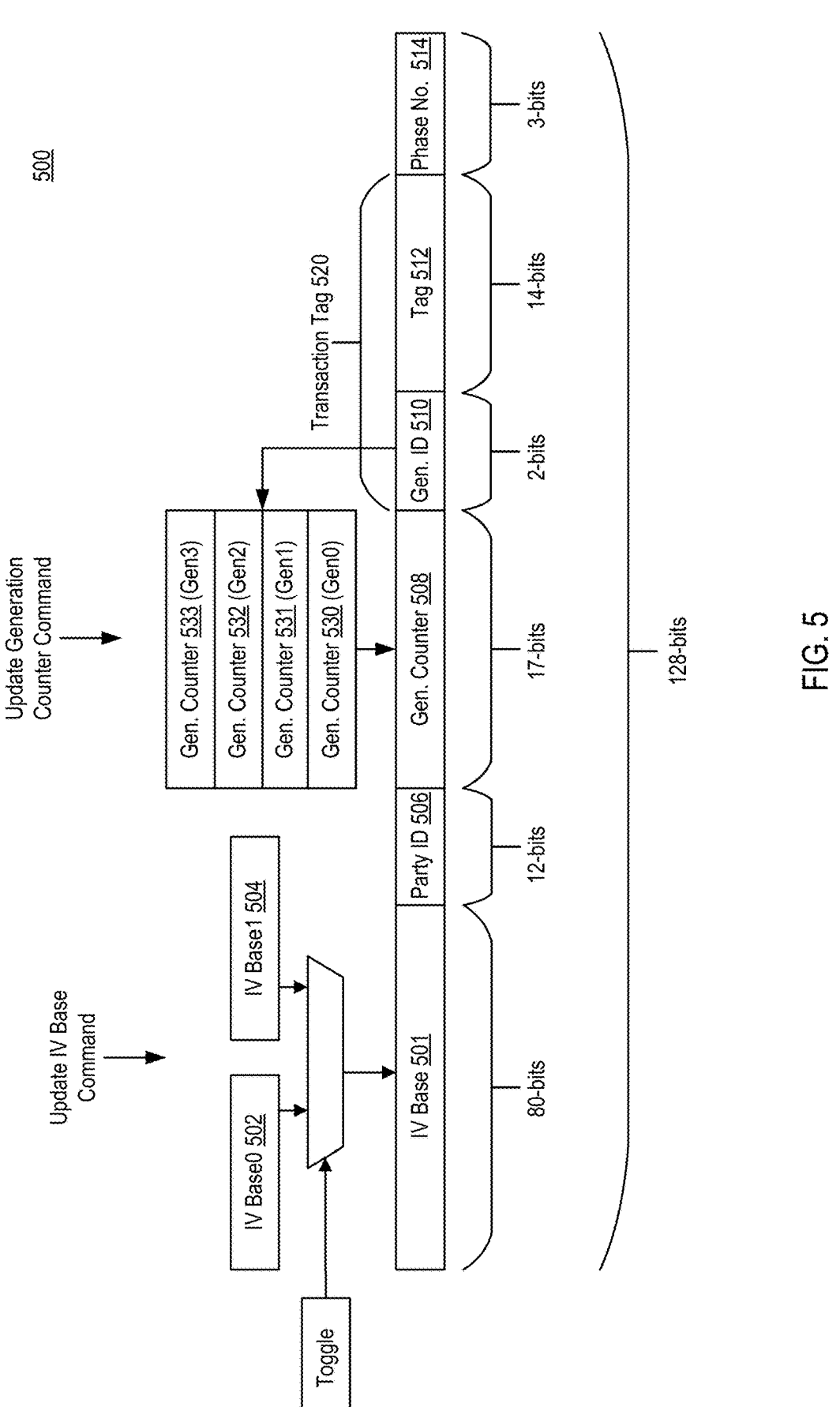
FIG. 5 is a diagram of an example initialization vector formulation for multi-part transaction integrity protection and encryption in accordance with embodiments of the present disclosure.

As previously mentioned, AES-GCM requires sending the IV with the data being encrypted and integrity protected to solve the problem caused by the reordering of packets by the fabric between the sender and receiver. For further explanation, FIG. 5 illustrates an example formulation of an IV 500 for multi-part transaction integrity protection and encryption in accordance with embodiments of the present disclosure. In accordance with the present disclosure, embodiments formulate an IV from the data being sent. By doing so, additional bits are not required to be transmitted to support the out of order nature of the CXL protocol. That is, the IV is formulated by each side from information already transmitted in the packets and information that is shared between the requestor and responder. For example, an IV base, generation counter, and party identifiers may be pre-shared by the requestor and responder in a separate message, and this pre-shared information can be used and updated by each side along with information within the packet to generate unique IVs for each transaction. The additional information in the packets that is used to formulate the IV may include the transaction tag as well as a phase number for the transaction and other information identified in FIG. 5 that are already included in the packet. When a requestor initiates a new transaction, the requestor generates a transaction tag. The transaction tag is used to identify that a particular packet belongs to a particular transaction.

In the example of FIG. 5, the example IV 500 is formulated using information from packet including a 2-bit generation ID 510, a 14-bit tag 512, and a 3-bit phase number 514. The tag 512 is generated by the sender (typically the requestor) and may be, for example, the CQUID or UQID in CXL.cache (padded to 14-bits if necessary) or the queue entry in CXL.mem. Each tag 512 is used sequentially and only once per generation. The generation ID 510 indicates the generation with which the tag 512 is associated. The generation ID 510 is incremented once all of the tags 512 have been used and their corresponding transactions completed. The generation ID 510 and the tag 512 are used as the transaction tag 520 described above. The transaction tag 520 is a field that is already included in the packet structure. The phase number 514 indicates which phase the packet is associated with and is incremented with each packet in a transaction. The example IV 500 is also formulated using a generation counter 508. The generation counter 508 is incremented each time all the tags in a generation have retired, where a tag retires when the transaction with which the tag is associated has completed. In the example of FIG. 5, there are four generation counters 530, 531, 532, 533—one for each generation. Thus, each generation counter counts the number of completed generations associated with a specific generation ID 510, and the generation ID 510 is used to determine which generation counter to increment. For example, generation counter 531 may be incremented each time a generation of commands associated with generation ID '01' have completed). The example IV is also formulated using a 90-bit IV base value 501 selectable between two 90-bit IV bases 502, 504. The IV bases 502, 504 are pre-shared in a separate message, and special command messages may be used to update the IV base that is used. Thus, the generation counter 530 and the IV base value 501 are not transmitted with the packet. The example IV 500 is also formulated using a 12-bit party ID 506 that is either pre-shared and selected by the Logical Device ID (LID) field in the packet or based on the other information in the packet that identifies the party of the transaction.

As mentioned above, all tags 512 are used only once per generation. In the example of FIG. 5, there are $2^{14}$ tags in a generation. The generation counter 508 counts the number of generations that have elapsed. While only one generation counter may be used, using two or more generation counters may prevent stalling as a generation counter cannot be incremented until all commands within the generation have completed (and thus the tags in the generation are retired). In the example, of FIG. 5, four generation counters 508 correspond to four generations of tags 512, which is indicated by the generation ID 510 associated with the tag 512. Having four generations allows for the necessary handshakes between the requestor and responder to keep these values in sync before having to use tags 512 for the corresponding generation again. A special command message may be sent to indicate that all commands in the generation have completed and thus the generation counter can be incremented by all parties. Once the counter(s) reaches a threshold, the IV base is updated. Having two IV bases allows for the necessary handshakes between the requestor and responder to make the switch between which IV base is the primary IV base (PIV) and allows for transactions that are already in flight to select which IV base is being used for the IDE process.

Using the IV formulation of FIG. 5 in the context of CXL.mem, for example, a requestor can use $2^{14}$ unique tags 512 before updating the 2-bit generation ID 510. This means that the requestor can generate $2^{16} \times 2^{17}$ unique commands with one IV base. A special message can be exchanged between the requestor and other devices on the data link to increment the generation counter 508. A special message can be exchanged between the requestor and targets on the data link to select the IV base. Once it is known that all commands for an IV base have been completed, then the IV base is updated. Thus, when the generation counter reaches a certain threshold, the parties can switch from the first IV base to the second IV base, making the second IV base the primary. Once all commands associated with the first IV base have been completed, then the first IV base can be updated with a special message exchange. Employing multiple generation counters and multiple IV bases prevents stalling.

By formulating the IV in this manner, minimal additional information needs to be transmitted with each individual request, thus adding no overhead to the transaction. In the case of CXL.cache, a 2-bit Generation ID is added to effectively extend the tag space. In the case of CXL.mem, the 2-upper tag bits are used as the Generation ID, basically dividing the tag space into four generations (i.e., no additional bits are added for CXL.mem). An additional protocol is used for updating the generation counters and toggling between IV base values. These updates are performed less frequently than transactions thus minimizing the overhead while also allowing that transactions can be received or processed out-of-order and without stalling. Further, the unique transaction tag is used in the MAC generation, thus replaying a previous request or response in a replay attack will fail the MAC validation.

The process of splitting the encryption, decryption, and MAC generation between two parties and across multiple phases of a transaction is explained using a particular example with additional reference to FIG. 3. In this particular example of a CXL.mem transaction, a host generates a M2S request directed to a device using AES-GCM and an IV formulated as described above. That is, prior to the transaction, the host and device securely shared the secret key and the IV base(s). Other pre-shared information, such as the party ID and generation counters are also exchanged. The host formulates the IV using this pre-shared information and a tag that is included in the M2S request packet. The host encrypts the IV (encrypted counter 0), increments the IV, and encrypts the incremented IV (encrypted counter 1). The host then encrypts plaintext in the M2S request (e.g., a plaintext including a command opcode and parameters) using encrypted counter 1 by XORing, for example, 37 bits of the M2S request with 37 bits of encrypted counter 1. The host then sends the M2S request packet with the ciphertext and the unencrypted authentication data to the device. The authentication data may include, for example, 40 bits of the address, the 16-bit tag, a validity bit, and a 3-bit traffic control tag. The host also saves a state that includes the information being sent to the device.

Continuing this example, the device receives the M2S request packet. To decrypt the M2S request, the device creates counter 0 by formulating the IV using the pre-shared information as well as the unencrypted tag in the M2S request, and encrypts counter 0 (encrypted counter 0). The device increments the IV and encrypts the incremented counter (encrypted counter 1). The device then decrypts the ciphertext by XORing 37 bits with 37 bits of encrypted counter 1. The device then prepares, for example, a 19-bit plaintext response to the M2S request. The device encrypts the 19-bit plaintext response by XORing the plaintext with the next 19 bits of encrypted counter 1 (the remainder of encrypted counter 1 is not used).

To encrypt the data for the data response, the device increments counter 1 and generates encrypted counter 2, and XORs the first 128-bits of data with encrypted counter 2 to create encrypted data block1. The device increments counter 2 to generate encrypted counter 3 and XORS the next 128 bits of data with encrypted counter 3 to create encrypted data block 2. The device increments counter 3 to generate encrypted counter 4 and XORs the next 128 bits of data with encrypted counter 4 to create encrypted data block 3. The device increments counter 4 to generate encrypted counter 5 and XORs the next 128 bits of data with encrypted counter 5 to create encrypted data block 4. The device then prepares packets for the encrypted S2M data response header and the four blocks of encrypted data that include 17 bits of authentication data (e.g. a 16-bit tag and a validity bit). The device also generates a MAC for integrity checking the M2S request packet, the S2M data response packet, and the data transmission packets by combining the 59 bits of authentication data from the M2S request packet and the 17 bits of authentication data from the S2M data response packet. The device uses the combined authentication data and the plaintext input (that includes the recovered plaintext of the M2S request, the plaintext of the S2M response, and the plaintext data blocks) to generate the MAC. The device then transmits the S2M data response packet, data packets, and MAC to the host over the data link (e.g., the CXL fabric).

The host receives the S2M data response and data packets and decrypts the ciphertext in those packets using the same technique. To decrypt the S2M response, the host XORs the encrypted 19-bits of the S2M data response packet with the next 19 bits of encrypted counter 1. To decrypt the data from the data response, the host increments counter 1 to generate encrypted counter 2 and XORs the ciphertext of data block1 with encrypted counter 2 to retrieve the plaintext of data block1. The host increments counter 2 to generate encrypted counter 3 and XORs the ciphertext of data block 2 with encrypted counter 3 to create retrieve the plaintext of data block 2. The host increments counter 3 to generate encrypted counter 4 and XORs the ciphertext of data block 3 with encrypted counter 4 to retrieve the plaintext of data block 3. The host increments counter 4 to generate encrypted counter 5 and XORs the ciphertext of data block 4 with encrypted counter 5 to retrieve the plaintext of data block 4. The host then performs MAC generation as discussed above plaintext input that includes the plaintext of the M2S request, the recovered plaintext of the S2M response, and the recovered plaintext of the data blocks, as well as the authentication data included in the S2M response (and potentially authentication data included in the data packets). The host compares this MAC to the MAC sent by the device to check the integrity of the transaction.

Figure 6:
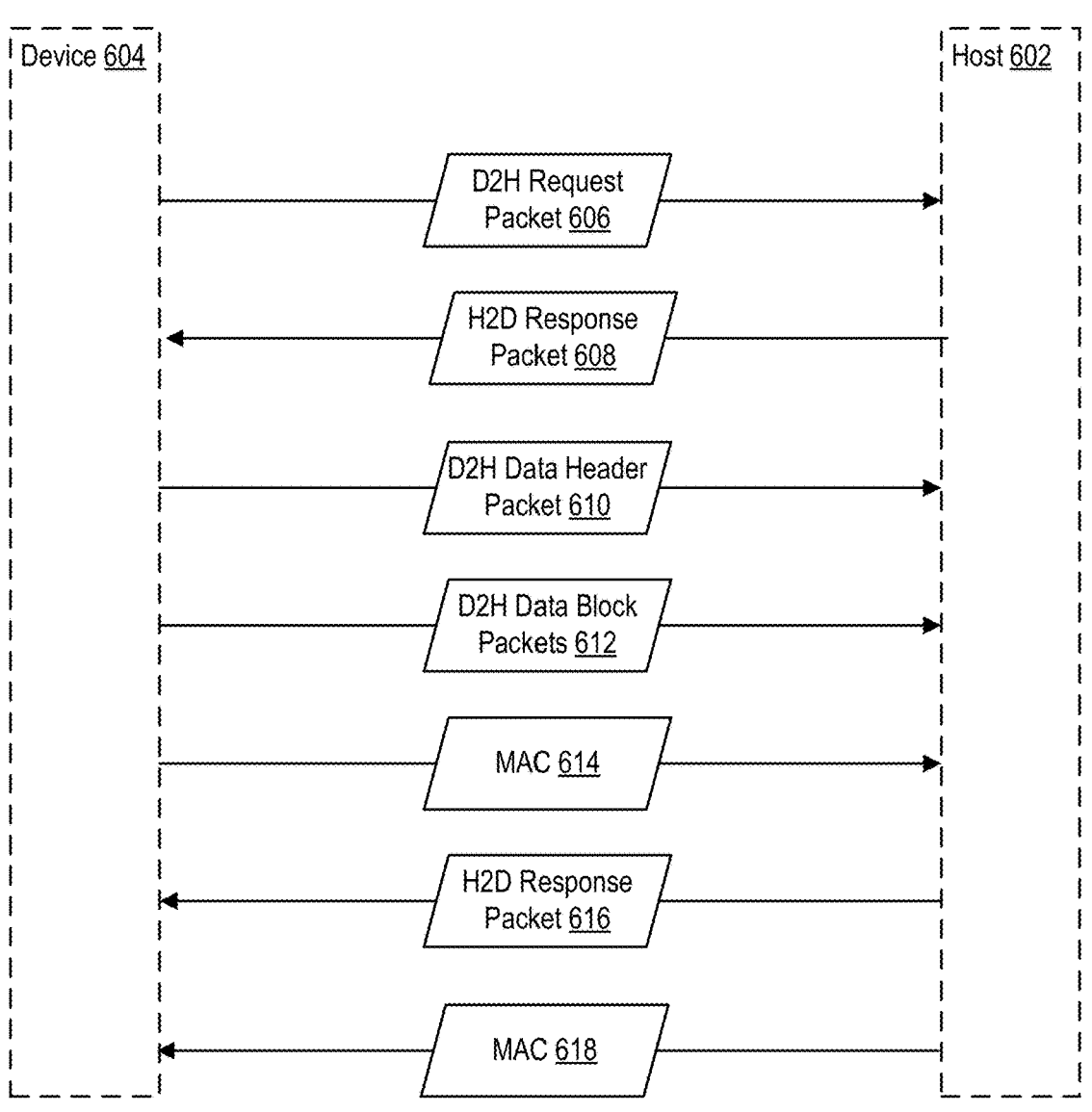
FIG. 6 is a diagram of another example transaction for multi-part transaction integrity protection and encryption in accordance with embodiments of the present disclosure.

For further explanation, FIG. 6 sets forth a diagram illustrating another example transaction 600 for multi-part transaction integrity protection and encryption according to embodiments of the present disclosure. The example of FIG. 6 includes a CXL.cache device to host (D2H) write transaction. Here, the host 602 (e.g., a host CPU) is the responder and a device 604 is the requestor. In this particular type of transaction, the host and the device must both ensure the transaction is integrity protected, meaning that both need to receive a MAC. In the first phase of the transaction, the device 604 generates plaintext for a request and encrypts the plaintext to ciphertext using an IV generated using the techniques described above and employing, for example, the CQID for a D2H request. The device 604 then sends a D2H request packet 606 to the host 602 that includes the ciphertext and authentication data. In contrast to conventional techniques, the device 604 does not send a MAC for the D2H request packet 606. The device 604 saves a state that includes the plaintext and authentication data that was used to create the D2H request packet 606. Notably, the transaction tag (the CQID in this example) included in the D2H request packet is part of the authentication data and is also used to generate the IV used to encrypt and decrypt the request.

The host 602 receives the D2H request packet 606 and formulates the IV using the transaction tag in the packet (the CQID of the D2H request) and the pre-shared IV base. The host 602 decrypts the ciphertext and saves the recovered plaintext in a transaction state. The host 602 then generates plaintext for a H2D response, and encrypts the plaintext to ciphertext using the IV generated based on the transaction tag (in this example, the CQID). The host 602 then sends an H2D response packet 608 that includes the response ciphertext and authentication data that includes original the transaction tag (the CQID) and also an encrypted tag (e.g., the UQID of the host) to be used for the write phase of the transaction. The host 602 saves the plaintext that was used to create the H2D response and the authentication data in a transaction state.

The device 604 receives the H2D response packet 608 and formulates the IV using the transaction tag in the packet (the CQID in this example) and the pre-shared IV base. The device 604 decrypts the ciphertext to recover the plaintext of the host response including the tag received from the host (the UQID in this example), and saves this information in the transaction state. In response to H2D response, the device 604 generates plaintext for a D2H data header and encrypts this plaintext using an IV formulated based on the tag received from the host (the UQID in this example). The device 604 also prepares plaintext data blocks and encrypts the plaintext to ciphertext data blocks using the IV formulated based on the tag received from the host (the UQID in this example). The device 604 then sends a D2H data header packet 610 that includes the data header ciphertext and authentication data that includes the second transaction tag (the UQID of the host). The device 604 also sends D2H data block packets 612 that include the ciphertext data blocks. The device 604 saves the plaintext for the D2H data header and the plaintext data blocks in the transaction state. The device 604 also generates a MAC 614, as discussed above, using the IV formulated based on the tag received from the host (the UQID in this example). The plaintext input for generating the MAC 614 includes the plaintext that was used by the device 604 to create the D2H request packet, the plaintext that was recovered from the H2D response packet 608, the plaintext that was used by the device 604 to create the D2H data header packet 610, and the plaintext for the data blocks. The authentication data used to generate the MAC 614 includes a concatenation of authentication data sent by the device 604 and authentication data received from the host 602. At this point, the device may save the MAC and discard the data used to generate the MAC.

The host 602 receives the D2H data header packet 608 and data packets 610 and formulates the IV, as discussed above, using the host's transaction tag (the UQID) in the packet. The host 602 decrypts the ciphertext in those packets and saves the recovered plaintext in a transaction state. The host 602 also generates a MAC using the IV formulated based on the host's tag (the UQID in this example) for comparison to the received MAC 614. The plaintext input for this MAC includes the plaintext that was recovered from the D2H request packet 606, the plaintext that was used by the host 602 in sending the H2D response packet 608, the plaintext that was recovered from the D2H data header packet 610, and the recovered plaintext of the data block packets 612, all of which is available in the saved transaction state. The authentication data used to generate the MAC includes a concatenation of authentication data sent by the device 604 and authentication data received from the host 602. The host 602 then compares this MAC to the MAC 614 received from the device 604 to verify the integrity of the transaction.

The host 602 then generates plaintext for an H2D response (e.g., an acknowledgement), and encrypts the plaintext to ciphertext using the IV formulated based on the original transaction tag (in this example, the CQID of the device). The host 602 then sends a second H2D response packet 616 that includes the response ciphertext and authentication data that includes the transaction tag (the CQID). The host 602 saves the plaintext that was used to create the second H2D response and the authentication data in a transaction state. The host 602 then generates a MAC 618 using the IV formulated based on the original transaction tag (in this example, the CQID of the device). The plaintext input for MAC 618 includes the plaintext that was recovered from the D2H request packet 606, the plaintext that was used by the host 602 in sending the H2D response packet 608, the plaintext that was recovered from the D2H data header packet 610, the recovered plaintext of the data block packets 612, and the plaintext used to create the second H2D response packet 616, all of which is available in the saved transaction state. The authentication data used to generate the MAC includes a concatenation of authentication data sent by the device 604 and authentication data received from the host 602. The host 602 transmits this final MAC 618 to the device 604. In a particular variation, the host and device can agree that state information preceding a first MAC is not used to generate a second MAC. Instead, the first MAC is used to represent the information exchanged before the first MAC. In such a variation, the host 602 generates the second MAC 618 using the first MAC and the plaintext used to create the second H2D response packet 616 as input for MAC generation. When the device 604 performs the MAC check using the plaintext recovered from the second H2D response packet and the MAC 614 that it transmitted to the host. Thus, the parties do not have to save all information sent and received if they can save state (a MAC or partial MAC) that covers the previous information.

The device 604 performs a MAC check by retrieving plaintext from the saved transaction state and generating a MAC for comparison, as discussed above, using the IV formulated based on the original transaction tag (in this example, the CQID of the device). This MAC is then compared to the MAC 618 received from the host 602 to confirm the integrity of the transaction.

Thus, the host 602 and the device 604 can both ensure the transaction is integrity protected as both receive a MAC. The MAC generation and encryption is split between both the host 602 and the device 604, and as a result the number of MACs transmitted can be reduced to two (one in each direction). The party (requestor or responder) validating the MAC controls the transaction tag that is included in the authentication data used in MAC generation. That party can ensure that the tag is unique and only used once. As such, replaying a previous request or response will fail the MAC validation.

Figure 7:
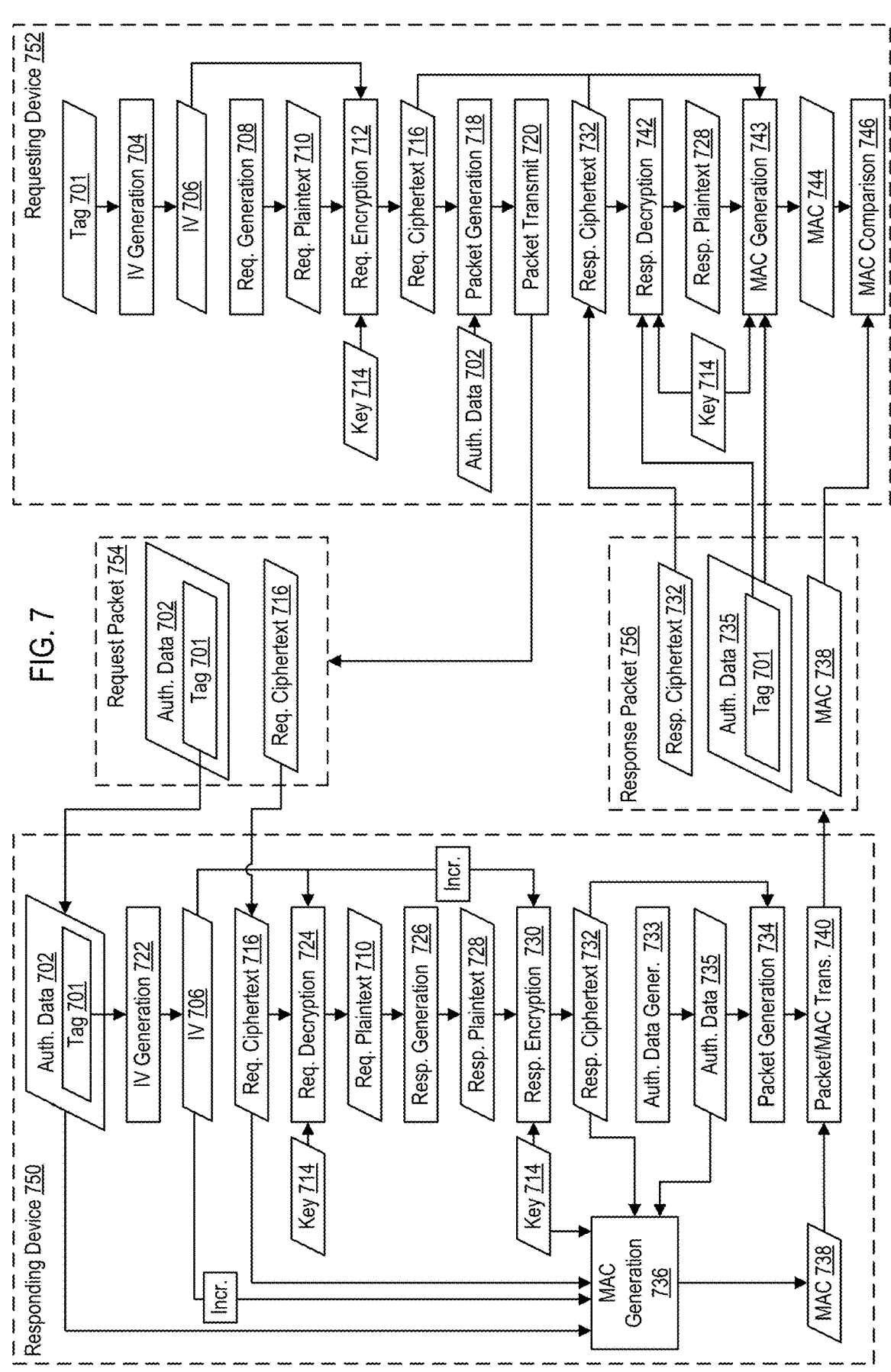
FIG. 7 is a detailed flow of an example transaction for multi-part transaction integrity protection and encryption in accordance with embodiments of the present disclosure.

For further explanation, FIG. 7 sets forth a flow chart of an example method for multi-part transaction integrity protection and encryption according to embodiments of the present disclosure. The example of FIG. 7 illustrates a simple request and response transaction between a requesting device 752 and a responding device 750, wherein the response is provided with a MAC. The flow begins with the requesting device 752 selecting a tag 701 for the transaction and using the tag 701, a pre-shared IV base, and other information such as that described above with reference to FIG. 5 for IV generation 704 to generate the IV 706. At request generation 708, the requesting device 752 generates request plaintext 710 and encrypts the request plaintext 710 at request encryption 712 using the IV 706 and a shared encryption key 714. The request ciphertext 716 and authentication data 702 that includes the tag 701 are used at packet generation 718 to create a packet 754 that is sent at packet transmit 720.

The responding device 750 receives the packet 754 including the request ciphertext 716 and the authentication data 702 including the tag 701. The responding device creates the IV 706 using the tag 701, the pre-shared IV base, and other information such as that described above with reference to FIG. 5 for IV generation 722. The responding device 750 applies the request ciphertext 716, the IV 706, and the encryption key 714 to request decryption 724 to recover the request plaintext 710. The responding device

750 uses the request to generate response plaintext 728 at respond generation 726. At response encryption 730, the responding device 750 increments the IV 706 (e.g., by incrementing the phase number) and generates response ciphertext 732 using the incremented IV and the encryption key 714. At authentication data generation 733, the responding device 750 creates the authentication data 735, which includes the tag 701. At response packet generation 734, the responding device creates a packet 756 that includes the response ciphertext 732 and the authentication data 735 that includes the tag 701. The responding device also generates a MAC 738, at MAC generation 736, using the IV 706, the encryption key 714, authentication data 702 and 735, and input blocks that include the received request ciphertext 716 and the generated response ciphertext 732. At packet/MAC transmission 740, the responding device 750 sends the packet 756 and the MAC 738 to the requesting device 752. The MAC 738 may be sent in packet 756 or in a separate packet.

The requesting device 752 receives the packet 756 and the MAC 738. At response decryption 742, the requesting device 752 recreates the IV 706 using the tag 701 identified from the authentication data 735, the pre-shared IV base, and other information such as that described above with reference to FIG. 5. The requesting device 752 increments the IV 706 corresponding to the transaction phase and decrypts the response ciphertext 732 using the incremented IV and the encryption key 714 to recover the response plaintext 728. At MAC generation 743, the requesting device 752 uses the IV, the encryption key 714, the authentication data 735, and a input blocks that include the original request ciphertext 716 and the received response ciphertext 732 to generate a verification MAC 744. If the received MAC 738 and the verification MAC 744 are determined to match at MAC comparison 746, then the flow of messages in the transaction is authenticated. Although only one message from the requesting device 752 to the responding device 750 and one message from the responding device 750 to the requesting device 752 is depicted, it should be understood that multiple message (e.g., request, response, data headers, data, acknowledgments) can be exchanged one or both directions before a MAC is generated and verified.

Figure 8:
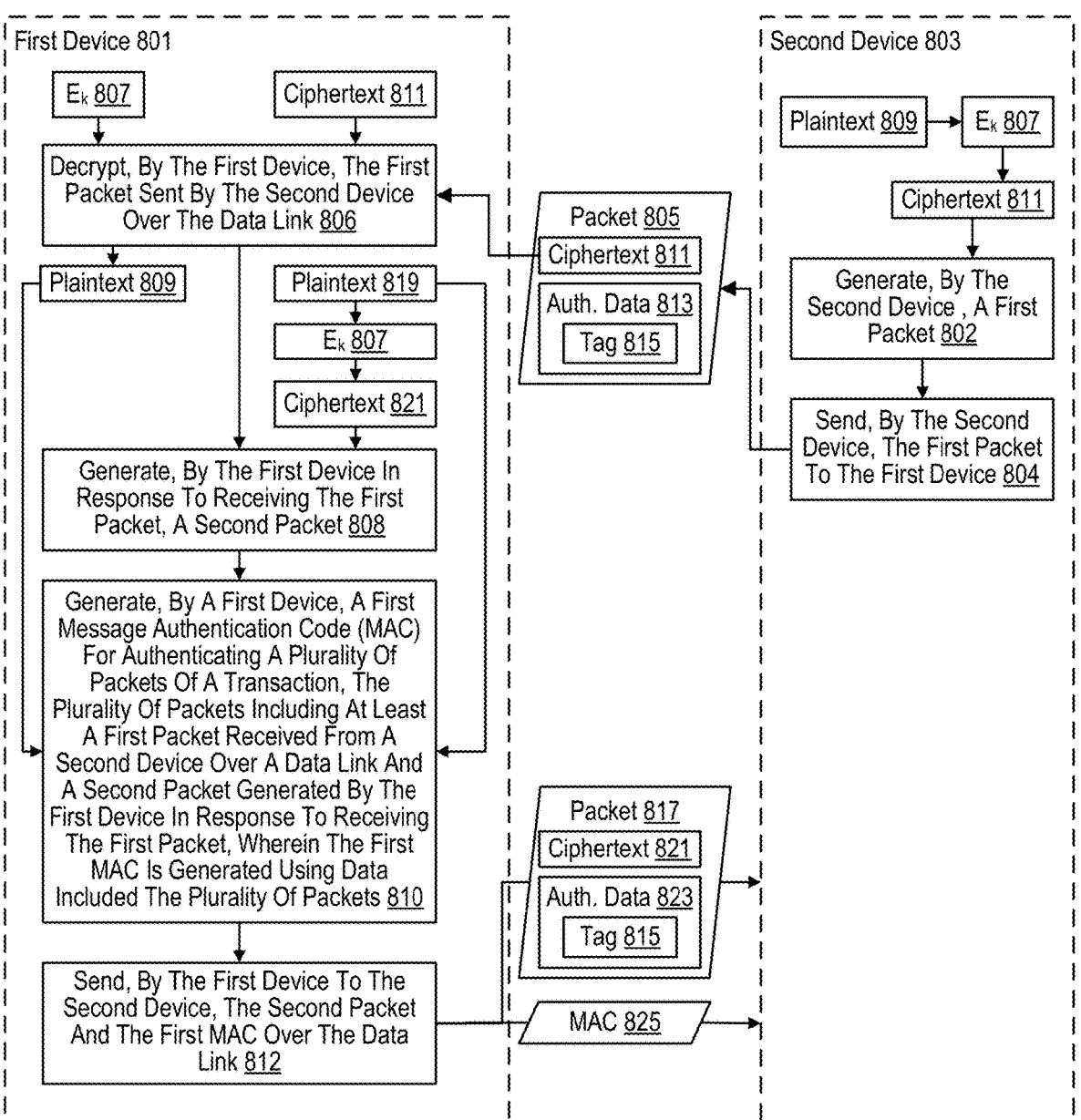
FIG. 8 is a flowchart of an example method for multi-part transaction integrity protection and encryption according to some embodiments of the present disclosure.

For further explanation, FIG. 8 sets forth a flow chart of an example method for multi-part transaction integrity protection and encryption according to embodiments of the present disclosure. The example of FIG. 8 illustrates at least part of a transaction between a first device 801 and a second device 803. In various arrangements, the first device 801 may be the host or master (e.g., a host processor) or the second device 803 may be the host or master. In various scenarios, the first device 801 may be the requestor of the transaction and the second device 803 may be the responder or target, or the first device 801 may be the responder or target and the second device 803 may be the requestor. The transaction is carried out over a data link. In some examples, the data link is a bus, such as compute express link (CXL) protocol bus. In other examples, the data link may be a network link that utilizes, for example, a web-based protocol. The fabric or transport layer that delivers transaction packets between the first device 801 and the second device 803 may reorder transactions, such that packets may be received out of the order in which they were sent. To ensure that data in transaction packets is secure and authentic, communication between the first device 801 and the second device 803 utilizes counter mode symmetric encryption such as AES-GCM.

The method of FIG. 8 may include generating 802, by the second device 803, a first packet 805. To generate the first packet 805, the second device applies an encryption key 807 to plaintext 809 to generate ciphertext 811. The plaintext 809 may be a command, response, acknowledgment, data header, data block, etc. The first packet 805 includes the ciphertext 811 and authentication data 813 that includes a tag 815, which identifies the first packet 805 as part of this transaction. Where the first packet 805 is a request packet and the second device 803 is the requestor, the second device 803 may select the tag 815 to be used for the transaction. Where second device 803 is the responder, the tag 815 may be obtained from the request packet initially sent by the first device 801. It should be appreciated that one or more packets of the transaction may precede the first packet 805. The method of FIG. 8 also includes sending 804, by the second device 803, the first packet 805 to the first device 803. The plaintext 809 is stored by the second device 803 as part of a saved state for the transaction.

The method of FIG. 8 also may include decrypting 806, by the first device 801, the first packet 805 sent by the second device 803 over the data link. The first device 801 decrypts ciphertext 811 in the first packet 805 using the encryption key 807 to recover the plaintext 809. The plaintext 809 is stored by the first device 801 as part of a saved state for the transaction.

The method of FIG. 8 also may include generating 808, by the first device 801 in response to receiving the first packet 805, a second packet 817. To generate the second packet 817, the first device 801 applies an encryption key 807 to plaintext 819 to generate ciphertext 821. The plaintext 819 may be a response, acknowledgment, data header, data block, etc. The second packet 817 includes the ciphertext 821 and authentication data 823 that includes the tag 815, which identifies the second packet 817 as part of this transaction.

The method of FIG. 8 includes generating 810, by the first device 801, a first message authentication code (MAC) 825 for authenticating a plurality of packets of a transaction, the plurality of packets including at least the first packet 805 received from the second device 803 over the data link. The first device 801 generates a second packet 817 in response to receiving the first packet 805, wherein the MAC 825 is generated using data included in the plurality of packets 805, 817. In some examples, the first device 801 generates 810 the MAC 825 for authenticating the plurality of packets of the transaction using the plaintext that is both sent by the first device and recovered from packets sent by the second device. For example, the plaintext 819 recovered from the first packet 805 sent by the second device 803 and the plaintext 819 generated by the first device 801 to send in the second packet 817 are applied as plaintext input to an authentication tag algorithm such as AES-GCM. Plaintext from any other packets that preceded the first packet are also applied as plaintext input. In some examples, plaintext from the first packet 805 (e.g., a request packet) and plaintext from the second packet (e.g., a response packet) are combined in the same plaintext block that is input to the authentication tag algorithm. In some examples, the authentication data that is supplied as input to the authentication tag algorithm includes a concatenation of authentication data 813 included by the first device 801 and the authentication data 823 included by the second device 803. Thus, by saving state information for the transaction including plaintext that is sent and received, the MAC 825 is generated using data provided by both parties to the transaction and can be verified by using that same state information. This provides authentication for multiple transaction packets sent by both parties using a single MAC.

The method of FIG. 8 also includes sending 812, by the first device 801 to the second device 803 over the data link, the second packet 817 and the first MAC 825. In some examples, the first device 801 sends the MAC 825 as part of the second packet 817. In other examples, the first device 801 sends the second packet 817 and the MAC 825 as separate packets. The second device 803 can authenticate the transaction by generating a counterpart MAC and comparing it to the MAC 825 sent by the first device 801.

Figure 9:
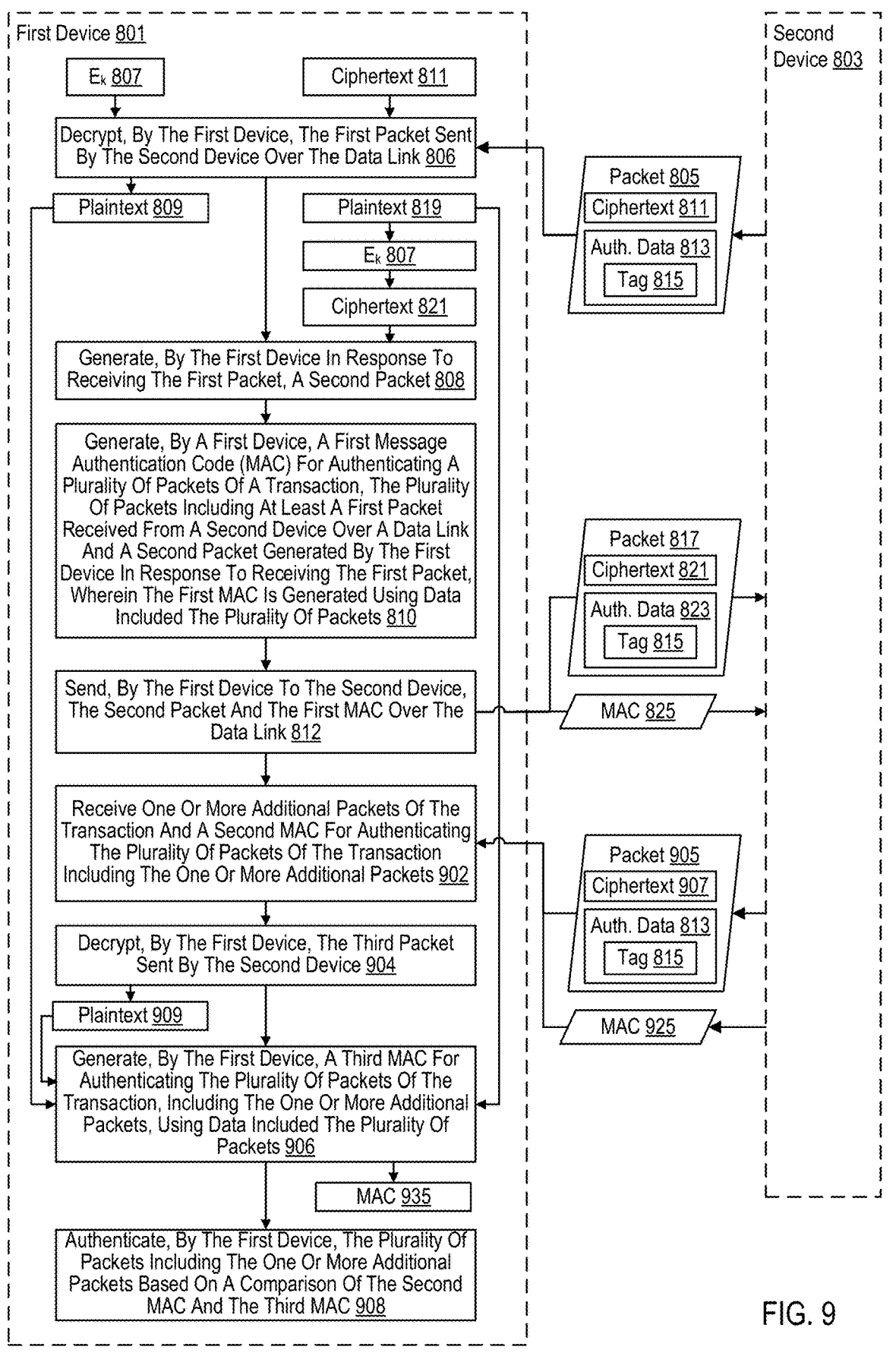
FIG. 9 is a flowchart of another example method for multi-part transaction integrity protection and encryption according to some embodiments of the present disclosure.

For further explanation, FIG. 9 sets forth a flow chart of an example method for multi-part transaction integrity protection and encryption according to embodiments of the present disclosure. The example of FIG. 9 extends the method of FIG. 8 in that the method of FIG. 9 may also include generating, by the second device 803, one or more additional packets 905 of the transaction. For example, the additional packet 905 may be a response to the second packet 817, an acknowledgement of receipt of the second packet 817, or an acknowledgement that a command has been completed. The one or more additional packets 905 may be generated in the same manner as discussed above, such as the generation of the first packet 805. The method of FIG. 9 may also include generating, by the second device 803, a second MAC 925. The second device 803 may generate the second MAC 925 in the same manner as discussed above, in that data from all of the packets of the transaction preceding the generation of the second MAC 925, including the additional packets 905, is used to generate the second MAC 925. Alternatively, the second MAC 925 can be generated based on the first MAC 825 and the additional packets 905 since the first MAC 825 was generated. The method of FIG. 9 may also include sending, by the second device, one or more additional packets 905 of the transaction to the first device 801.

The example of FIG. 9 extends the method of FIG. 8 in that the method of FIG. 9 includes receiving 902, by the first device 801 from the second device 803, one or more additional packets 905 of the transaction and the second MAC 925 for authenticating the plurality of packets 805, 817, 905 of the transaction including the one or more additional packets 905. For example, the additional packet 905 may be a response to the second packet 817, an acknowledgement of receipt of the second packet 817, or an acknowledgement that a command has been completed. The second MAC 925 can be used to validate the integrity of all of the packets of the transaction including the one or more additional packets 905 that have just been received. The one or more additional packets 905 and the second MAC 925 are received over the data link.

The method of FIG. 9 further includes decrypting 904, by the first device, the one or more additional packets 905. The first device 801 decrypts 904 the one or more additional packets 905 by applying the encryption key 807 to ciphertext 907 in the additional packet 905 to recover plaintext 909, as discussed above.

The method of FIG. 9 further includes generating 906, by the first device 801, a third MAC 935 for authenticating the plurality of packets of the transaction, including the one or more additional packets 905, using data included in the plurality of packets 805, 817, 905. In some examples, the first device 801 generates 912 the MAC 935 for authenticating the plurality of packets of the transaction using the plaintext that is both sent by the first device 801 and recovered from packets sent by the second device 803. For example, the plaintext 809 recovered from the first packet 805 sent by the second device 803, the plaintext 819 generated by the first device 801 and sent in the second packet 817, and the plaintext 909 recovered from the third packet 905 sent by the second device 803 are applied as plaintext input to an authentication tag algorithm such as AES-GCM.

The method of FIG. 9 further includes authenticating 908, by the first device 801, the plurality of packets including the one or more additional packets based on a comparison of the second MAC 925 and the third MAC 935. In some examples, the first device 801 validates the integrity of all of the packets exchanged in the transaction by determining whether the second MAC 925 and the third MAC 935 are identical.

Figure 10:
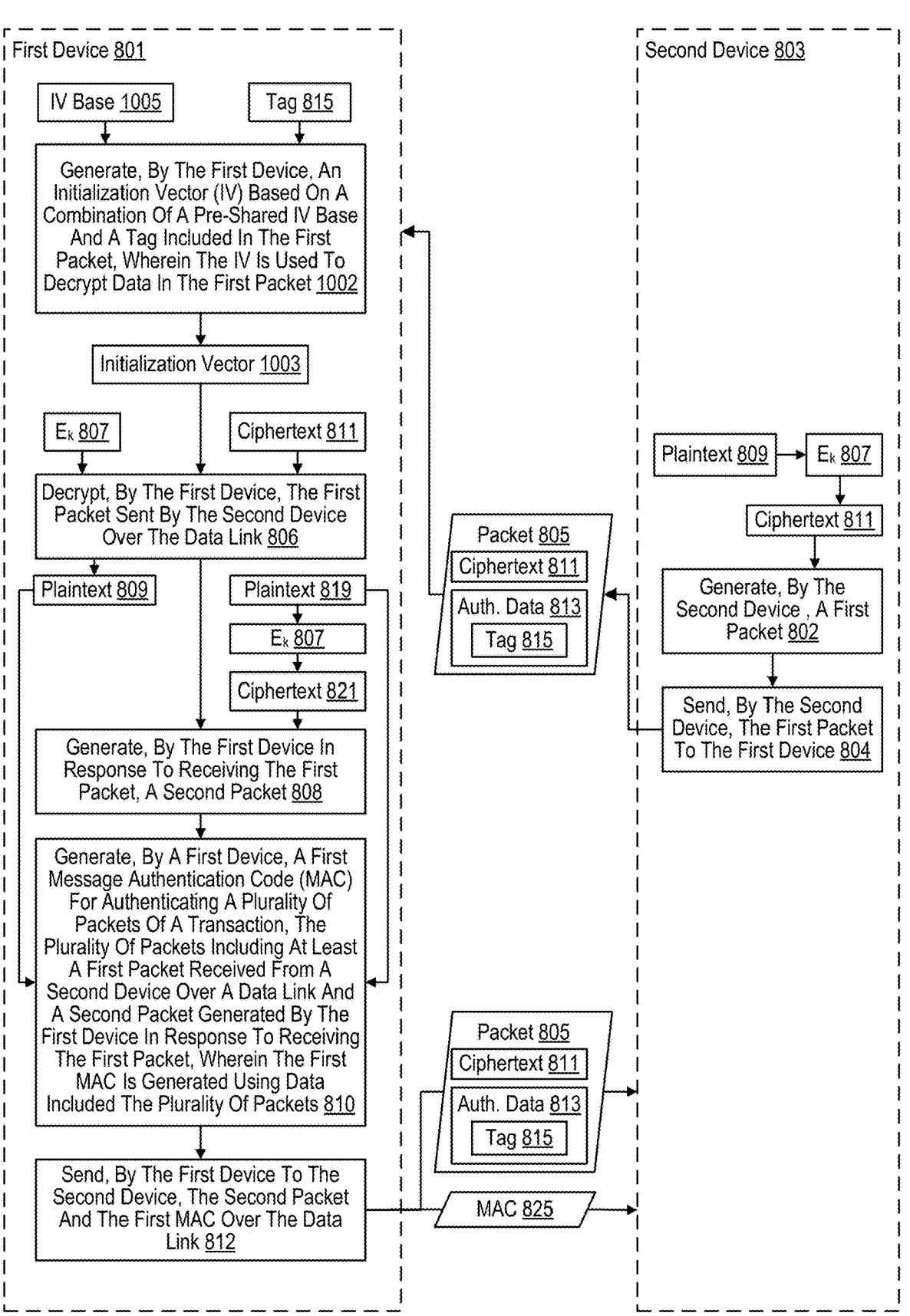
FIG. 10 is a flowchart of another example method for multi-part transaction integrity protection and encryption according to some embodiments of the present disclosure.

For further explanation, FIG. 10 sets forth a flow chart of an example method for multi-part transaction integrity protection and encryption according to embodiments of the present disclosure. The example of FIG. 10 extends the method of FIG. 8 in that the method of FIG. 10 includes generating 1002, by the first device 801, an initialization vector (IV) 1003 based on a combination of a pre-shared information such as an IV base 1005 and information included in the first packet such as a tag 815, wherein the IV 1003 is used to decrypt data in the first packet 805. In some implementations, the IV is formulated using the other information described above with reference to FIG. 5. As noted earlier, an IV is not transmitted with each packet in order to reduce link bandwidth overhead. However, pre-sharing an IV is not possible when packets may be reordered by the fabric. Thus, the first device 801 and the second device 803 share an IV base 1005 that will form part of the IV (e.g., the first 90 bits of the IV), and may also pre-share other information that will be included in the IV 1003 as described above with reference to FIG. 5. The rest of the IV 1003 is formulated using information included in the packet, such as the tag 815 (e.g., the transaction tag) and other information as described above with reference to FIG. 5. The tag 815 is selected by the requestor of the transaction and is only used once per generation of tags (i.e., all tags are exhausted before incrementing the generation ID). Thus, a unique IV for a transaction is generated upon sending or receiving a packet based on the information in the packet. Because the IV is generated using information unique to the transaction, the problems due to reordering are obviated. Further, because the tag 815 is already included for identification of the command, no additional overhead is introduced. In the example of FIG. 10, the first device 801 generates the IV 1003 using the pre-shared IV base 1005 and the tag 815 that is included in the first packet 805, and uses the IV 1003 to decrypt the ciphertext in the packet 805.

Figure 11:
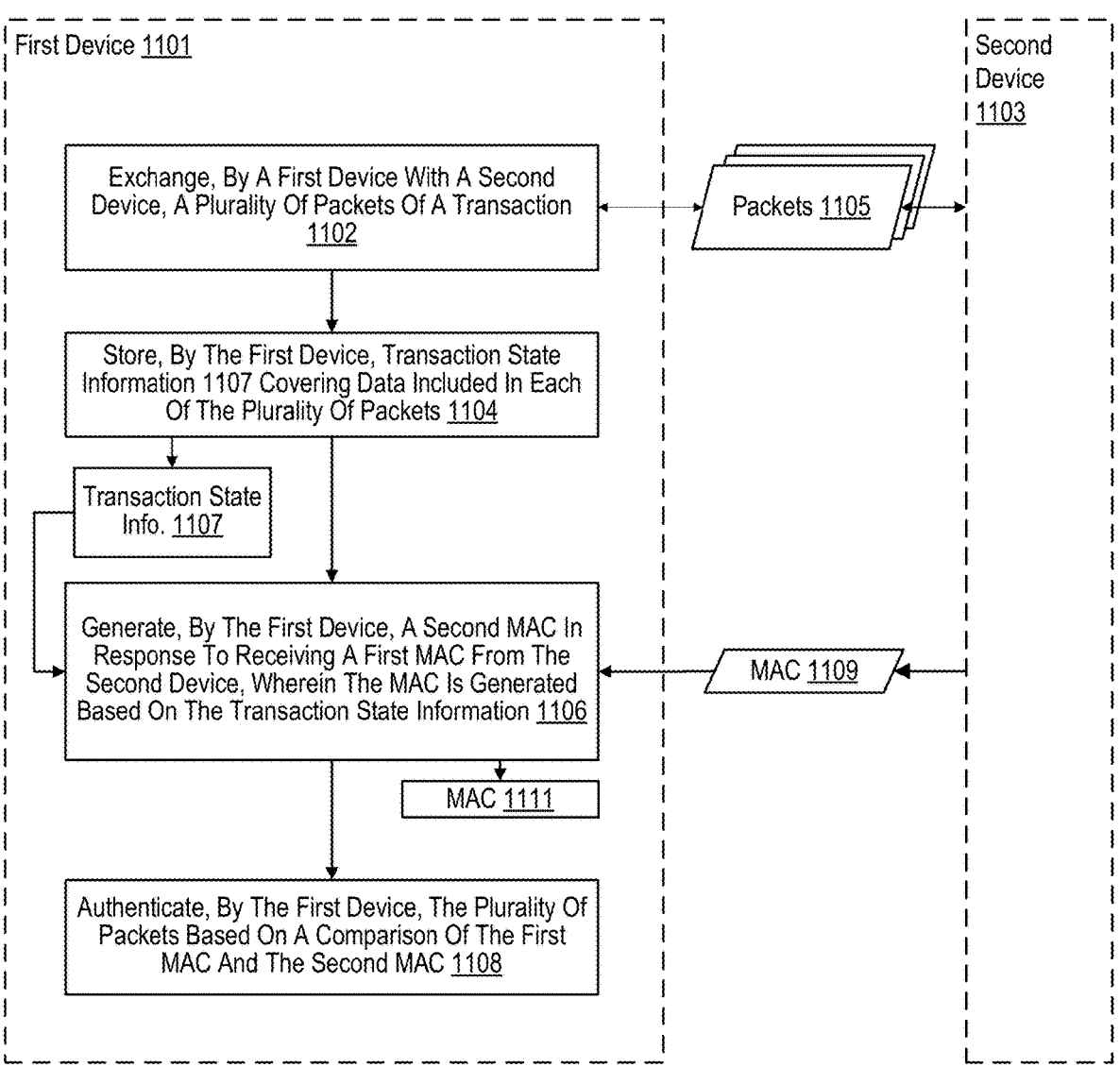
FIG. 11 is a flowchart of another example method for multi-part transaction integrity protection and encryption according to some embodiments of the present disclosure.

For further explanation, FIG. 11 sets forth a flow chart of an example method for multi-part transaction integrity protection and encryption according to embodiments of the present disclosure. The method of FIG. 11 is similar to the method of FIG. 9 except that in FIG. 11 a device does not generate and send a MAC before receiving a MAC. The method of FIG. 11 includes exchanging 1102, by a first device 1101 with a second device 1103, a plurality of packets 1105 of a transaction. The plurality of packets include one or more packets sent by the first device to the second device and one or more packets received from the second device.

The method of FIG. 11 also includes storing 1104, by the first device 1101, transaction state information 1107 covering data included in each of the plurality of packets 1105. In some examples, the transaction state information includes blocks of plaintext that were encrypted and sent to the second device 1103 and blocks of plaintext that were recovered from ciphertext sent by the second device 1103. The transaction state information also includes authentication data that was sent to and received from the second device 1103. In some examples, the transaction state information includes a cryptographic representation of the data exchanged in the plurality of packets. For example, the transaction state information may include a MAC that represents a prior message flow. Thus, the transaction state information may cover data included in each of the plurality of packets by either storing the data or a cryptographic representation the data.

The method of FIG. 11 also includes generating 1106, by the first device 1101, a second MAC 1111 in response to receiving a first MAC 1109 from the second device 1103, wherein the MAC is generated based on data included in each of the plurality of packets. In some examples, the first device 1101 generates the second MAC 1111 using the plaintext inputs that include all of the plaintext from the saved transaction state, including plaintext that was encrypted and sent by the first device 1101 to the second device 1103, and plaintext that was recovered from encrypted data in packets received from the second device 1103.

The method of FIG. 11 also includes authenticating 1108, by the first device 1101, the plurality of packets 1105 based on a comparison of the first MAC 1109 and the second MAC 1111. In some examples, the first device 1101 validates the integrity of all of the packets exchanged in the transaction by determining whether the first MAC 1109 and the second MAC 1111 are identical.

Figure 12:
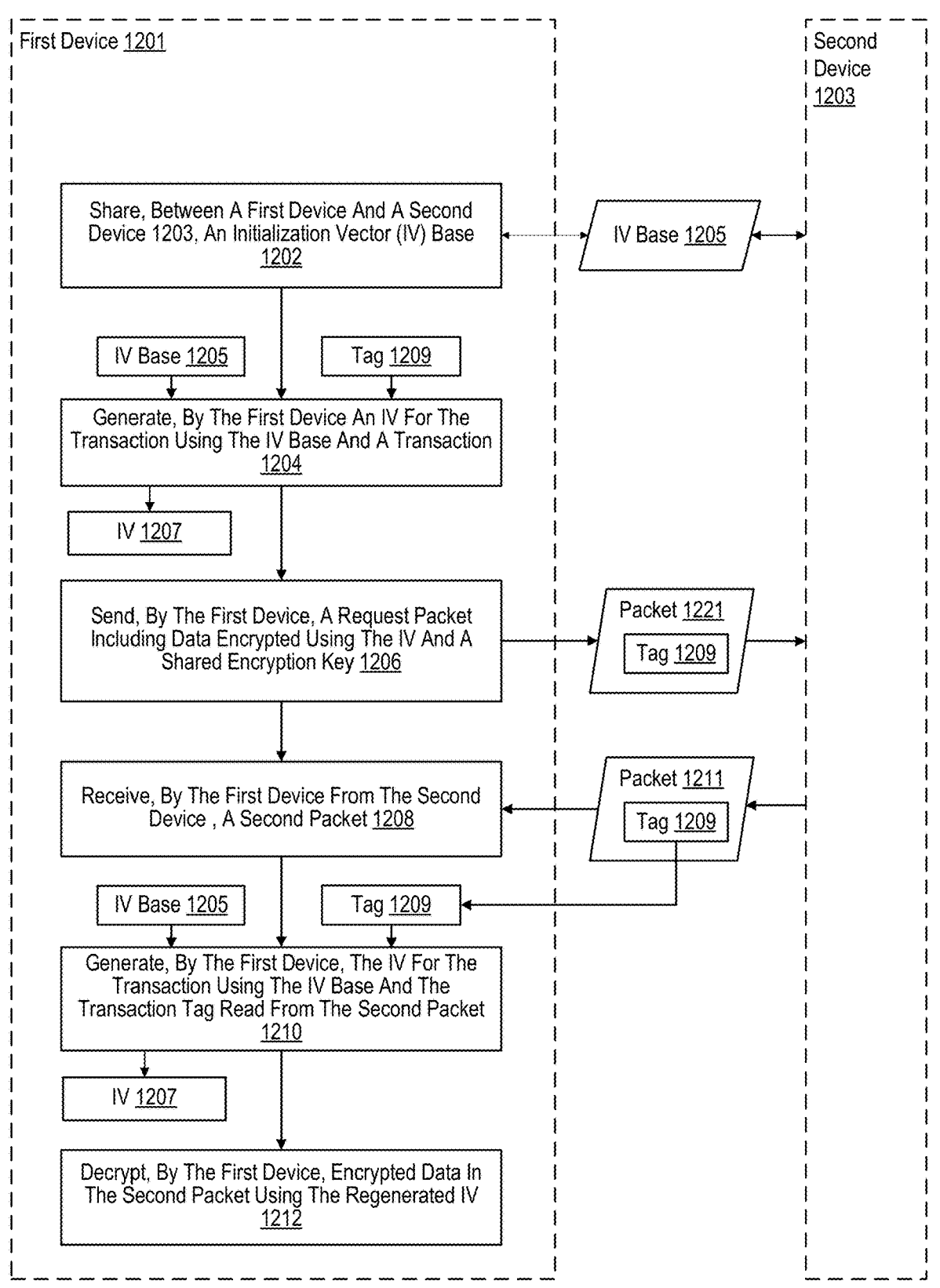
FIG. 12 is a flowchart of another example method for multi-part transaction integrity protection and encryption according to some embodiments of the present disclosure.

For further explanation, FIG. 12 sets forth a flow chart of an example method for multi-part transaction integrity protection and encryption according to embodiments of the present disclosure. The method of FIG. 12 includes sharing 1202, between a first device 1201 and a second device 1203, an initialization vector (IV) base 1205. The IV base 1205 may be sent or received by the first device 1201 using a special protocol message for sharing an IV base.

The method of FIG. 12 also includes generating 1204, by the first device 1201 an IV 1207 for the transaction using the IV base 1205 and a transaction tag 1209. In some examples, the transaction tag 1209 is selected by the first device 1201 when creating a request packet for a transaction. In some examples, the first device 1201 generates the IV 1207 by concatenating the IV base 1205, the transaction tag 1209, and other information either pre-shared between the first device 1201 and the second device 1203 or related to control information from the request packet. For example, the IV 1207 is formulated as described above with reference to FIG. 5.

The method of FIG. 12 also includes sending 1206, by the first device 1201, a request packet 1221 including data encrypted using the IV 1207 and a shared encryption key. Encrypting data using an IV is described above. The method of FIG. 12 also includes receiving 1208, by the first device 1201 from the second device 1203, a second packet 1211. The second device 1203 returns the same transaction tag 1209 in the second packet 1211.

The method of FIG. 12 also includes generating 1210, by the first device 1201, the IV 1207 for the transaction using the IV base 1205 and the transaction tag 1209 read from the second packet 1211. It will be appreciated that, because the IV 1207 is generated using shared state information including the IV base 1205, as well as the same transaction tag 1209, the initial IV 1207 and the second IV 1207 will be identical.

The method of FIG. 12 also includes decrypting 1212, by the first device 1201, encrypted data in the second packet 1211 using the regenerated IV 1207. Decrypting data using an IV is described above.

Although the technique that created the example can be applied to any communications protocol, it is most useful for transaction-based protocols where a significant percentage of the messages are small or where out of order delivery is possible, such as CXL and some web-based protocols. For a transaction-based protocol, the end of the transaction is the natural boundary for the final MAC. Further the overhead associated with MAC generation for small message transmitted is high. To adapt the above-described techniques to a particular protocol, the threat model for the protocol should be identified and all transaction types in the protocol should be identified. For each transaction type, all of the messages that are exchanged to complete the transaction should be identified. Both sides of the transaction must retain enough state so that they can generate a MAC covering all previous message flows of the transaction if required. All the retained state for a transaction can be discarded once the final flow of the transaction is either sent or verified, and in some implementations retained state can be discarded once a MAC for the preceding flow has been sent or verified. For each transaction and for each message in a transaction, it should be determined whether an attacker can cause undetected harm, as defined by the threat model, if they can examine the message, modify the message, create a fake message, or tamper with the message. If harm can be caused, a MAC that covers all pervious messages in the transaction should be inserted with the message that can cause harm. Until the message sequence is complete, each party to the transaction must retain the MAC or saved state so that they can verify the final MAC or generate an intermediate MAC if required. When the final MAC is sent, the retained state may be discarded.

In view of the explanations set forth above, readers will recognize a number of advantages of multi-part transaction integrity protection and encryption according to embodiments of the present disclosure including:

MAC generation, as well as encryption and decryption, is split between the requestor and the responder based on data that is transmitted in both directions, allowing one MAC to authenticate multiple packet exchanges, thus reducing the number of MAC transmissions and conserving bandwidth on the data link.

An IV is formulated from the data being sent or received, thus additional bits are not required to be transmitted to support the out-of-order nature of various protocols.

The MAC always includes unique information as part of the IV, which prevents all replay attacks.

Exemplary embodiments of the present disclosure are described largely in the context of a fully functional computer system for multi-part transaction integrity protection and encryption. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for multi-part transaction integrity protection and encryption, the method comprising:

generating, by a first device, plaintext based on a first packet received from a second device,
  wherein the first packet is received without receiving a message authentication code (MAC);

encrypting, by the first device, the plaintext to generate a ciphertext for a second packet;

generating, by a first device, a first MAC for authenticating a plurality of packets of a transaction, the plurality of packets including at least the first packet received from the second device over a data link and the second packet generated by the first device in response to receiving the first packet, wherein the first MAC is generated using data included in the plurality of packets including the first packet, the second packet, and one or more additional packets, the data including the plaintext; and sending, by the first device to the second device, the plurality of packets and the first MAC over the data link to cause the second device to generate a second MAC to authenticate the second packet, the plurality of packets including the second packet and the one or more additional packets.

2. The method of claim 1, wherein the plurality of packets includes at least one of a request packet and a response packet.

3. The method of claim 1, wherein the plurality of packets includes a data header packet and one or more data transmission packets.

4. The method of claim 1 further comprising:

receiving, by the first device from the second device, one or more additional packets of the transaction and a third MAC for authenticating the plurality of packets of the transaction including the one or more additional packets;

decrypting, by the first device, the one or more additional packets;

generating, by the first device, a fourth MAC for authenticating the plurality of packets of the transaction, including the one or more additional packets, using data included in the plurality of packets; and authenticating, by the first device, the plurality of packets including the one or more additional packets based on a comparison of the third MAC and the fourth MAC.

5. The method of claim 1 further comprising:

generating, by the first device, an initialization vector (IV) based on a combination of a pre-shared information and information included in the first packet, wherein the IV is used to decrypt data in the first packet.

6. The method of claim 5, wherein the pre-shared information includes at least one of an IV base and a generation count.

7. The method of claim 6, wherein one or more commands are used to update at least one of the IV base and the generation count.

8. The method of claim 5, wherein the information included in the first packet includes at least a tag and a generation identifier for the tag.

9. The method of claim 1, wherein transactions are reordered by the data link.

10. The method of claim 1, wherein the data link is a bus.

11. The method of claim 10, wherein the bus is a compute express link (CXL) bus.

12. The method of claim 1, wherein the first device is a host processor.

13. The method of claim 1, wherein the second device is a host processor.

14. An apparatus for multi-part transaction integrity protection and encryption, the apparatus including a first device coupled to a data link for exchanging packetized data in multi-part transactions over the data link with one or more other devices, wherein the first device is configured to:

generate, by the first device, plaintext based on a first packet received from a second device, wherein the first packet is received over a data link without receiving a message authentication code (MAC);

encrypt, by the first device, the plaintext to generate a ciphertext for a second packet;

generate, by the first device, a first MAC for authenticating a plurality of packets of a transaction, the plurality of packets including at least the first packet received from the second device over the data link and the second packet generated by the first device in response to receiving the first packet, wherein the first MAC is generated using data included in the plurality of packets including the first packet, the second packet, and one or more additional packets, the data including the plaintext; and send, by the first device to the second device, the plurality of packets and the first MAC over the data link, the plurality of packets including the second packet and the one or more additional packets.

15. The apparatus of claim 14, wherein the plurality of packets includes at least one of a request packet and a response packet.

16. The apparatus of claim 14, wherein the plurality of packets includes a data header packet and one or more data transmission packets.

17. The apparatus of claim 14, wherein the first device is further configured to:

receive, by the first device from the second device, one or more additional packets of the transaction and a second MAC for authenticating the plurality of packets of the transaction including the one or more additional packets;

decrypt, by the first device, the one or more additional packets;

generate, by the first device, a third MAC for authenticating the plurality of packets of the transaction, including the one or more additional packets, using data included in the plurality of packets; and authenticate, by the first device, the plurality of packets including the one or more additional packets based on a comparison of the second MAC and the third MAC.

18. The apparatus of claim 14, wherein the first device is further configured to:

generate, by the first device, an initialization vector (IV) based on a combination of a pre-shared information and information included in the first packet, wherein the IV is used to decrypt data in the first packet.

19. The apparatus of claim 18, wherein the pre-shared information includes at least one of an IV base and a generation count.

20. The apparatus of claim 19, wherein one or more commands are used to update at least one of the IV base and the generation count.

21. The apparatus of claim 18, wherein the information included in the first packet includes at least a tag and a generation identifier for the tag.

22. The apparatus of claim 14, wherein transactions are reordered by the data link.

23. The apparatus of claim 14, wherein the data link is a bus.

24. The apparatus of claim 23, wherein the bus is a compute express link (CXL) bus.

25. A method for multi-part transaction integrity protection and encryption, the method comprising:

exchanging, by a first device with a second device, a plurality of packets of a transaction;

decrypting ciphertext in a packet, of the plurality of packets, to obtain plaintext, the packet being received from the second device;

storing, by the first device, transaction state information covering data included in each of the plurality of packets;

generating, by the first device, a second message authentication code (MAC) in response to receiving a first MAC from the second device, wherein the second MAC is generated based on the transaction state information, the data included in each of the plurality of packets, and the plaintext; and authenticating, by the first device, the plurality of packets based on a comparison of the first MAC and the second MAC.

\* \* \* \* \*